United States Patent [19]

Beckley

[11] 4,369,104

[45] Jan. 18, 1983

[54] CONTINUOUS FILAMENT GRAPHITE COMPOSITE ELECTRODES

[75] Inventor: Don A. Beckley, Newport Beach, Calif.

[73] Assignee: Hitco, Irvine, Calif.

[21] Appl. No.: 87,215

[22] Filed: Oct. 22, 1979

[51] Int. Cl.³ ........................................... C25B 11/12
[52] U.S. Cl. .................................. 204/286; 204/294; 204/290 R; 429/44
[58] Field of Search ............. 204/290 R, 294; 429/42, 429/44

[56] References Cited

U.S. PATENT DOCUMENTS

| | | | |
|---|---|---|---|
| 3,554,812 | 1/1971 | Sturm et al. | 429/44 X |
| 3,619,391 | 11/1971 | Eisner | 204/149 |
| 3,756,933 | 9/1973 | Greenberg | 204/149 |
| 3,892,640 | 7/1975 | Furuta | 204/149 |
| 3,974,070 | 8/1976 | Popov et al. | 210/47 |
| 4,046,664 | 9/1977 | Fleet et al. | 204/280 |
| 4,072,596 | 2/1978 | Moeglich | 204/241 |
| 4,118,294 | 10/1978 | Pellegri | 204/129 |
| 4,159,934 | 7/1979 | Kadija | 204/224 R |
| 4,285,796 | 8/1981 | Stoner et al. | 204/290 R |

Primary Examiner—F. Edmundson
Attorney, Agent, or Firm—Marvin E. Jacobs

[57] ABSTRACT

Improved graphite composite electrodes are provided by dispersing within the matrix resin spaced, collimated graphite fibers having a diameter below 30 microns in a direction perpendicular to the face of the electrode plate. The electrodes are particularly useful in the disinfection of aqueous liquids with low power consumption and with very low ablation of the surface of the electrode.

14 Claims, 4 Drawing Figures

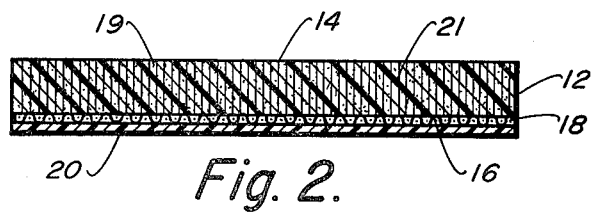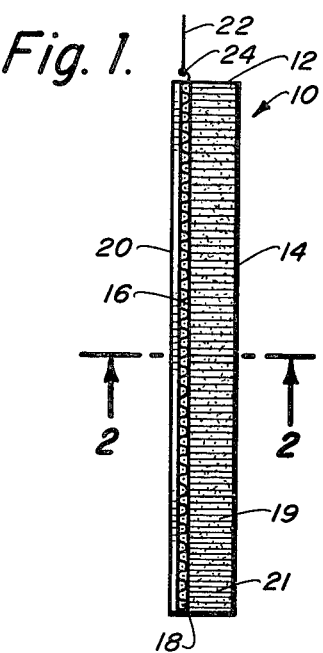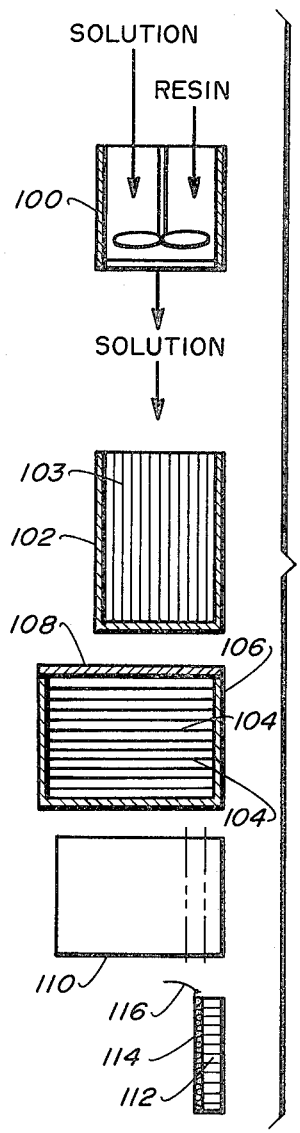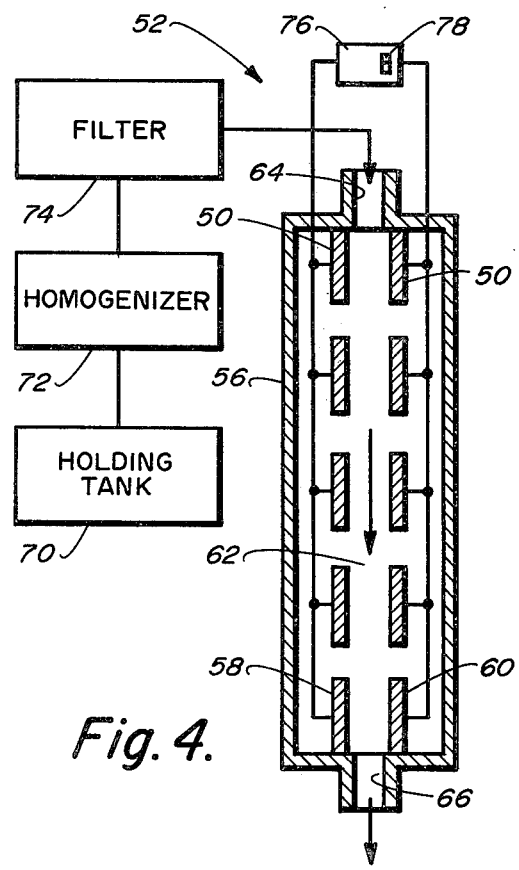

CONTINUOUS FILAMENT GRAPHITE COMPOSITE ELECTRODES

TECHNICAL FIELD

Recently enacted environmental regulations require the disinfection of many liquids before discharge into surface streams. By 1985, the U.S. Environmental Protection Agency will require shipboard disinfection of all wastewater. Other waters requiring disinfection are potable waters, cooling and process waters to control algae growth, hospital nebulizers and contact lens cleaning liquids. Thermal and chemical forms of disinfection and sterilizations are not suitable to most of these uses due to high cost of treatment and energy and requirements are not suitable for small scale uses.

Electrochemical disinfecting systems have been utilized in the past. The electrodes generally utilized were metal, carbon, graphite or resin impregnated carbon-graphite. These electrodes tend to roughen, foul or deteriorate causing very short service time before requiring cleanup or replacement. Furthermore, these electrochemical systems consume large amounts of electrical power to produce the high field strengths necessary for killing the micro-organisms present in the feed water.

Graphite is a desirable electrode material since it can readily and reproducibly be prepared in a low surface area form (pyrolitic or vitreous carbon) and is stable at anodic potentials where mercury is not useable and all but the noble metals corrode rapidly. Graphite electrodes are also inexpensive and comparatively non-toxic.

Bulk graphite has been employed as an electrode as a support for immobilized enzyme catalysts or to electrochemically regenerate coenzymes such as NaDH-NAD+. They have also been employed occasionally in anodic polarography for analytical purposes. Composite electrodes based on bulk or powdered graphite have been used commercially. Resin filled graphite anodes were extensively utilized in the chlor-alkali industry until the development of the titanium dimensionally stable anode (DSA). The graphite anodes had a short life. Five pounds of carbon anode were lost per ton of chlorine produced due to the anodic oxidation of bulk graphite at the comparatively high current densities employed in the chlorine-caustic cells. Porous graphite electrodes are prepared by sintering into a screen a slurry of graphite, metallic catalyst and particulate hydrophobic polymer.

Fiber reinforced composite materials due to the low weight and high strength are replacing structural metal components in many applications, especially in aircraft and automobiles. Though boron glass and graphite fibers have been utilized as reinforcement for the binder resins, only graphite is conductive. A typical composite containing 40 to 60% of randomly oriented graphite fibers will have a specific resistivity of 1 to 10 ohm-cm, high enough to be considered for use as an electrode material. Since the fibers are discrete they can function as an array of microelectrodes, each functioning at a point source for reaction. There has been no reported commercial use of graphite fiber-polymer composites as electrodes.

There have been several studies concerned with the electrochemical oxidation of graphite fibers influencing wettability, adhesion and absorption of organic and inorganic substances, but there was no employment of composites as electrodes. One study of graphite fibers as electrodes was concerned with interlaminar shear strength and wettability (Dietz, et al., *J. Materials Science*, 6 (1971), P. 1441).

Recently, graphite composite electrodes have been tested in prototype experimental electrochemical disinfection and potable waters systems. The disinfection reactor operates as a flow-through five plate, four cell, bipolar stack using 30 watts of power to treat influent flow of wastewater containing up to 150 ppm of solids. This is a considerable savings of energy, safety and space as compared to chemical disinfection of sewage. Disinfection is improved three-fold over previously studied reactors with resin-filled graphite or bulk graphite electrodes. The potable water reactor is also a flow-through, bipolar reactor.

The lifetime of these reactor systems is governed by the physical and electrochemical stability of the electrode plates which must withstand both anodic and cathodic electrolysis in a sea water or sewage environment. Power consumption is governed by compositional and form factors such as the type, size and distribution of the graphite fibers. Though the experimental reactors are demonstrating promising lifetimes and efficiencies, electrodes are subject to deterioration and power consumption has been higher than desired. Furthermore, the kill time for micro-organisms was not optimum nor was the mechanism understood.

DISCLOSURE OF THE INVENTION

Graphite composite electrodes having improved performance are provided in accordance with this invention. Though the use of discrete, randomly oriented, graphite fibers creates a multitude of localized sites for generating disinfecting species, it does not provide a continuous conduction path through the bulk of the electrode. This results in lower phase displacement and since the fibers are randomly oriented, a certain percent of the fibers will not have either end exposed to the electrolyte thus reducing the number of potential micro-electrode point sources for reaction.

It has been discovered in accordance with the invention that the use of continuous graphite fibers having the fiber ends oriented perpendicular to the electrode face maximizes microelectrode point reaction sites and dramatically improves the dielectric constant of the bulk electrode and the phase displacement during operation of a cell. The binder resin operates as a matrix to hold the individual fibers in alignment and insulates each fiber from all other adjacent fibers. Oriented fiber electrodes are convenient to fabricate since the fibers can be embedded in a curable solid resin as prepreg sheets which are layed up and cured to form an electrode. Another very efficient method of fabricating electrodes is to form a large block of cured sheets which is then sliced into individual electrodes. The controlled, oriented end spacing should also lead to decreased rate of deterioration of the binder resin since each fiber end will be surrounded with maximum amount of matrix resin. The electrode of the invention provides improved kill efficiency at lower power consumption.

In one form of electrolytic sewage treatment cell an AC square wave is utilized. At low voltage and power, a transient high field is generated which creates a chemical species in the saline solution, probably chlorine, which kills the micro-organisms. The rising voltage is out of phase with the current and is reversed before the electrode can be damaged. The field strength is enhanced by use of small fibers having a diameter from about 1 to 30 microns. Higher conductivity fiber is also preferred to enhance field strength which can be controlled by selection of precursor, firing temperature of precursor during graphitization and polishing of the fibers by tumbling or other means. Use of aligned, parallel graphite fibers in the matrix resin enhances dielectric constant which increases phase displacement. The use of oxidation resistant binder resins also contributes to significantly increased service life of over several hundred hours. A prototype flow-through cell is capable of disinfecting a urine rich liquid with 2 amperes of current at 15 volts peak voltage using the power consumption of a 30 watt light bulb.

These and many other advantages and attendant features of the invention will become apparent as the invention becomes better understood by reference to the following detailed description.

BRIEF DESCRIPTION OF DRAWINGS

FIG. 1 is a schematic drawing of a plate electrode in accordance with this invention;

FIG. 2 is a cross-section through lines 2—2 of FIG. 1;

FIG. 3 is a schematic flow sheet of a electrode forming process; and

FIG. 4 is a schematic view of a flow-through disinfection electrolytic reactor.

DETAILED DISCLOSURE OF THE INVENTION

Referring now to FIGS. 1 and 2, the electrode 10 is generally a rectangular plate member having a thickness from about 0.3 to 2.5 cm (1/30 to 1.0 inch) and a length and width from 2.5 to 30 cm (1 to 12 inches) for use in a flow-through disinfection reactor. Large plates can be used for larger capacity reactors and smaller and shaped configurations can be used in applications such as sterilizing contact lenses. The electrode comprises a plate 12 of oxidation resistant matrix resin 19 containing a plurality of discrete parallel graphite fibers 21 perpendicular to and extending from the active front surface 14 for removing pathogens from the liquid electrolyte and a rear surface 16. A conductive grid element 18 such as a metal screen can be adhered to the rear surface 16 by means of a conductive paste adhesive or can be simultaneously embedded therein during molding. The screen is encapsulated in a coating 20 of resin to protect it from the corrosive effects of the liquid to be treated and a conductor 22 is connected to the screen at contact 24, suitably by soldering.

The electrode plate is formed from a composition containing 20 to 70% by volume of graphite fibers, the remainder being oxidation and corrosion resistant binder resin forming the continuous matrix for the composite.

Carbon-graphite fibers suitable for use in this invention can be prepared from organic precursors such as acrylic polymers, polyvinyl alcohol, regenerated cellulose, pitch materials including petroleum residues, asphalt and coal tars. Highly oriented, synthetic polymer precursors such as acrylic polymers provide higher conductivity. Acrylic precursors do not melt prior to pyrolytic decomposition and strength properties of graphite fibers produced from acrylic precursors are substantially improved over regenerated cellulose based fibers.

The electrical conductivity of acrylic precursors is approximately five times that far regenerated cellulose based fibers and the degree of graphitization is substantially increased. This results from the fact that acrylic precursors yield a higher density of crystalline graphitic type of carbon as compared to the non-graphitic type of carbon produced from cellulosic materials. Furthermore, the carbon yield is approximately 45% as compared to only 25% from rayon.

The acrylic precursors may be homopolymers of acrylonitrile of copolymers produced by copolymerizing not less than 85% of acrylonitrile with not more than 15% of monovinyl compound such as methacrylate, methyl-methacrylate, vinyl-acetate, vinyl chloride, vinylidine chloride, 2-methyl-5-pyridine or the like.

Under application of heat, the precursor polymer cyclizes, that is, forms a six member hexagon ring similar to that found in graphite. Heating in an oxygen containing atmosphere is believed to permit oxygen to diffuse into the structure of the fiber and to form cross-links or chemical bonds between the polymer chains.

The preoxidized fiber is processed to suitably contain between about 5 to 25% oxygen, preferably about 12 to 15% oxygen. The pre-oxidized fiber is then cooled to a low temperature below about 100 degrees F., suitably to room temperature and is then subjected to firing and graphitization at a temperature above about 1500 degrees C. up to about 3000 degrees C. during graphitization in an inert atmosphere.

The matrix resin after being cured is resistant to the chemical and electrical environment of the electrolytic cell reactor. The resin can be a thermoplastic or thermosetting resin. Exemplary resins are polyamide, polyester, phenolic, silicon, polyimide, polybutadiene, flouro-carbon, polysulfone, polyaryl, polyether or epoxy resins. Some or all of the resin can be impregnated onto the fibers before forming the electrode.

The electrode can be formed by casting or molding. Usually pressure is applied during fabrication, generally during curing to remove all voids and gases and to assure that a dimensionally stable structure is prepared. A preferred fabricating procedure is to form a solution of the resin. The solution of resin is coated onto a lay-up of parallel fibers or the fibers can be dipped into solution. After evaporation of solvent, a prepreg of collimated, parallel fibers embedded in resin is formed. Resin cure can be partially advanced at this stage to increase viscosity. A plurality of sheets of prepreg are then placed in a mold and heated at a higher temperature and under pressure to form an electrode plate or electrode block. The block is then sliced into plates in a direction perpendicular to the fiber direction. The grid screen can be added to the mold or adhesively secured to the back face of the electrode plate with an adhesive paste after forming the plate. A lead conductor is soldered to the screen. The screen and edges of the plate may be coated with further amounts of resin which is subjected to heat for curing.

A resin system suitable for forming collimated graphite fiber prepreg sheet, and which can be cured to form an electrode resistant to the corrosion and erosion forces experienced during use in a disinfection reactor is a stageable fast curing epoxy resin cured with an amine catalyst. The epoxy resin is preferably a resinous epoxy polyether obtained by reacting an epihalohydrin, such as epichlorohydrin, epibromohydrin, epiiodihydrin, and the like, with either a polyhydric phenol or a polyhydric alcohol.

Among the polyhydric phenols which can be used in preparing these resinous epoxy polyethers are dihydric phenols represented by the general formula:

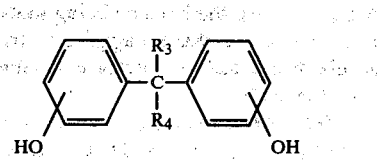

wherein the phenolic hydroxy groups may be in one of the 2,2'; 2,3'; 2,4'; 3,3'; 3,4' or 4,4' positions on the aromatic nuclei, and each of $R^3$ and $R^4$ represent hydrogen, or alkyl such as methyl, ethyl, propyl, isopropyl, butyl, sec-butyl, tert-butyl, pentyl, isopentyl, hexyl, isohexyl, and the like; a cyclo (lower) -alkyl group, such as a cyclohexyl or substituted cyclohexyl group, e.g., methyl-, ethyl-, propyl-, butyl-, pentyl-, and hexyl-substituted cyclohexyl, or an aromatic group, such as phenyl, tolyl, xylyl, and the like. In addition, the phenolic rings may have other substituents besides the hydroxyl group, for example, lower alkyl groups containing form one to four carbon atoms, e.g., methyl, ethyl, propyl, isopropyl, butyl, sec.-butyl and tert.-butyl groups, halogen atoms, i.e., flourine, chlorine, bromine or iodine, and the like.

An illustrative, but by no means exhaustive listing of dihydric phenols falling within this general formula includes 4,4'-dihydroxy-diphenyldimethylmethane, (bisphenol A),
2,4'-dihydroxydiphenyl-ethylmethane,
3,3'-dihydroxyidiphenyldiethylmethane,
3,4'-dihydroxy-diphenylmethylpropylmethane,
2,3'-dihydorxydiphenylethylphenylmethane,
4,4'-dihydroxydiphenylprophenylmethane,
4,4'-dihydroxydiphenylbutyl-phenylmethane,
2,2'-dihydroxydiphenylditolylmethane,
4,4'-dihydroxy-diphenyltolylmethylmethane, and the like.

Particularly preferred polyethers are the diglycidyl ethers prepared from 2,2-bis(4-hydroxyphenyl) propane, i.e., bisphenol A. They contain a chain of alternating glycidyl and 2,2-bis(4-phenylene) propane radicals separated by intervening etheral oxygen atoms and have a 1,2-epoxy equivalency between about 1.0 and about 2.0 as well as preferably, a molecular weight of about 340 to about 1000, and an epoxide equivalent weight of about 170 to about 500. The epoxide or epoxy equivalent weight is the weight of glycidyl polyether per epoxide group.

The polyepoxide can be cured with an 0.5 to 10 parts of a curing agent such as Lewis acid catalyst, suitably as boron trifluoride, amine complexes thereof or with a basic catalyst such as tertiary amine or a urea. Representative amine catalysts are tertiary amines such as hexamethylene tetramine or benzyldimethylamine or tertiary amine salts of alpha-oxy-substituted acids such as the lactic acid salt of 2,4,6-tri-(dimethylaminoethyl) phenol (DMP-3). The curing agents irreversibly convert polyepoxide compounds to an insoluble and infusible cured state in a reasonably short period of time at moderate temperature.

The composition may also contain 0.3 to 10 parts of curing promoters or accelerators such as tertiary amines, suitably benzoyldimethyl amine, or weakly acidic amphoteric compounds such as dicyandiamide, stearic hydrazide, succinimide and cyanoacetamide.

The composition may also contain various other materials such as plasticizers, elastomers, fillers, pigments, mold release agents and other resins.

The resin system generally includes 40 to 65 parts of epoxy resin, 5 to 20 parts of butadiene based elastomeric resins, 10 to 35 parts of a resin plasticizer such as a cycloaliphatic epoxy and 0.5 to 5 parts of amine curing agent and 1 to 10 parts of a curing promoter. The system may also include up to 10% by weight, e.g., metal stearates of other additives such as mold release agents, dyes, pigments.

Referring now to FIG. 3, the resin and solvent are added to tank 100 to form a 30 to 60% solids solution. The solvent can be a ketone, such as acetone.

The solution is impregnated onto a line of spaced, parallel, collimated graphite fibers 103 in a casting trough 102 in a preselected ratio of resin to fiber.

The solvent is evaporated to form solid prepreg sheets 104. A plurality of the prepreg sheets 104 are placed in molding cavity 106. The lid 108 is closed and the cavity is heated to curing temperature of at least 150 degrees C. (about 300 degrees F.) usually 170 degrees (350 degrees F.) to 200 degrees C. (392 degrees F.) under pressure of at least 50 psi to 300 psi for a time sufficient to complete cure. A block 110 is produced which is cut perpendicularly to the fiber direction into electrode blank 112. A metal electrode screen 114 is adhesively secured to a face of the blank and an electrode lead 116 is soldered onto the screen.

EXAMPLE 1

The following ingredients were combined in a mixer.

| Material | Type | Amount, Parts By weight |
|---|---|---|
| Epon 828 | Bisphenol A epoxy | 53.5 |
| Hydroxy-terminated polybutadiene Acrylonitrile | Elastomer | 10.5 |
| Butadiene | Elastomer | 3.0 |
| Cycloaliphatic epoxy | Plasticizer | 25 |
| Diamine | Curing Agent | 1 |
| Dicyandiamide | Curing Promoter | 7 |
| | | 100 |

The resin solids were dissolved in acetone to form a 50% solids solution. The solution was impregnated onto spaced collimated parallel T300 6K graphite fiber (a polyacrylonitrile based material containing 600 filament yarns/strand and having a strand diameter of 9 microns) in varying amounts to form prepreg sheets containing 20%, 40%, 50% and 60% graphite fiber. The solvent was evaporated and the prepreg sheets were layed up in molds 10.16 cm (4 inches) by 10.16 cm (4 inches) by 8.25 cm (3.25 inches) and cured for 2 hours at 177 degrees C. (350 degrees F.) at 100 psi. The cured block was cut transverse to the fiber direction into 0.635 cm (¼ inch) thick blanks. Silver mesh screen grids were adhesiveely secured to one face of the blank which were then cut in half into 5.08 cm (2 inch)×10.16 cm (4 inch)×0.635 cm (¼ inch) electrodes and current leads soldered to the grids and the grids and edges were then potted in epoxy resin.

Alternatively, a conductive grid can be deposited onto the surface of the electrode by vacuum deposit or electroless coating or electrolytic means. In a different configuration the conductive element is applied to a gasket and is placed in intimate contact with the electrode plate.

Referring now to FIG. 4, the electrode plates 50 are assembled into a flow-through disinfection reactor 52 in which a plurality of plates such as 6"×8¼"×3/16" are connected in series through the metal grids into a stack. The reactor 52 has a body 56 having a first compartment for receiving anode stack 58, cathode stack 60 and a central channel 62 between the stacks 58, 60 through which electrolytic waste liquid flows from inlet 64 to outlet 66. The NaCl present in sea water provides the electrolyte necessary for operation of the cell. An electrolyte salt must be added to liquids which do not inherently contain a electrolyte.

The liquid from holding tank 70 is processed in homogenizer 72 and filter 74 before being fed to inlet 64. The electrode stacks are connected to AC power source 76. When switch 78 is turned on, the reactor will disinfect urine rich liquid from which fecal solids have been removed with 30 watts of power. Ablation of the electrode faces proceeds in a controlled manner at the rate of only 1 mil per hour.

The electrodes of the invention will also find use as dimensionally stable anodes for chlorine recovery, electrolysis of water, purification of potable water, disinfection of heat exchanger or cooling tower water, anodes for electroplating and the like.

It is to be realized that only preferred embodiments of the invention have been described and that numerous substitutions, modifications and alterations are permissible without departing from the spirit and scope of the invention as defined in the following claims.

I claim:

1. An electrode comprising a shaped member having an electrode face and a rear face defining a thickness therebetween, said electrode comprising a composite of matrix resin surrounding spaced, parallel conductive graphite fibers each having first and second ends extending between said faces and having a diameter below thirty microns said composite including from 20 to 80% by volume of fibers, the balance being matrix resin; and
   a metal conductive element applied to the rear face of the electrode and in electrical contact with said first fiber ends.

2. An electrode according to claim 1 in which the fibers are disposed perpendicular to said faces.

3. An electrode according to claim 2 in which the graphite fiber has a diameter from 3 to 22 microns.

4. An electrode according to claim 3 in which the graphite fiber is a pitch based fiber.

5. An electrode according to claim 4 in which the matrix resin is an oxidation and chemical resistant thermosetting resin.

6. An electrode according to claim 5 in which the resin is an epoxy resin.

7. An electrode according to claim 6 in which the epoxy resin comprises a polyether of a polyhydric phenol.

8. An electrode according to claim 7 in which the epoxy resin is an amine cured dihydric phenol.

9. An electrode according to claim 1 in which the element is a metal screen grid.

10. An electrode according to claim 9 in which the screen grid is adhesively secured to the rear face.

11. An electrode according to claim 9 in which the element is electrodeposited onto the rear face of the electrode.

12. An electrode according to claim 1 in the shape of a flat plate.

13. An electrode according to claim 12 in which the plate is formed from a cured stack of sheets of curable resin containing spaced collimated graphite fibers.

14. An electrode according to claim 1 in which the metal element is encapsulated in a coating of resin.

* * * * *